(12) United States Patent
Hasemann et al.

(10) Patent No.: US 8,139,724 B2
(45) Date of Patent: Mar. 20, 2012

(54) METHOD AND SYSTEM FOR INCORPORATING AUDIO CLIPS DURING A VOICE CALL

(75) Inventors: Joerg-Michael Hasemann, Emtinghausen (DE); Christoph Dierkes, Bremen (DE)

(73) Assignee: Deutsche Telekom AG, Bonn (DE)

( * ) Notice: Subject to any disclaimer, the term of this patent is extended or adjusted under 35 U.S.C. 154(b) by 796 days.

(21) Appl. No.: 11/887,295

(22) PCT Filed: Jan. 4, 2006

(86) PCT No.: PCT/DE2006/000007
§ 371 (c)(1),
(2), (4) Date: Aug. 14, 2008

(87) PCT Pub. No.: WO2006/102857
PCT Pub. Date: Oct. 5, 2006

(65) Prior Publication Data
US 2009/0252307 A1 Oct. 8, 2009

(30) Foreign Application Priority Data

Mar. 26, 2005 (DE) .......................... 10 2005 013 952

(51) Int. Cl.
*H04M 11/00* (2006.01)
(52) U.S. Cl. ............... 379/88.13; 379/88.08; 379/88.12; 379/88.22
(58) Field of Classification Search ............... 379/88.24, 379/201.01, 88.16, 88.13, 88.22, 88.08, 67.1, 379/88.12
See application file for complete search history.

(56) References Cited

U.S. PATENT DOCUMENTS 6,301,342 B1 10/2001 Ander et al.
6,683,938 B1 1/2004 Henderson

FOREIGN PATENT DOCUMENTS

GB 2402295 A * 12/2004
WO WO 2004/064360 A 7/2004

* cited by examiner

*Primary Examiner* — Fan Tsang
*Assistant Examiner* — Simon King
(74) *Attorney, Agent, or Firm* — Kenyon & Kenyon LLP

(57) ABSTRACT

A method and a system for incorporating audio clips during a voice call between a calling subscriber A and at least one called subscriber B is provided. At least one of the subscribers A or B incorporates a desired audio clip into the voice call by a press of a button on the respective subscriber's telecommunications terminal.

12 Claims, 1 Drawing Sheet

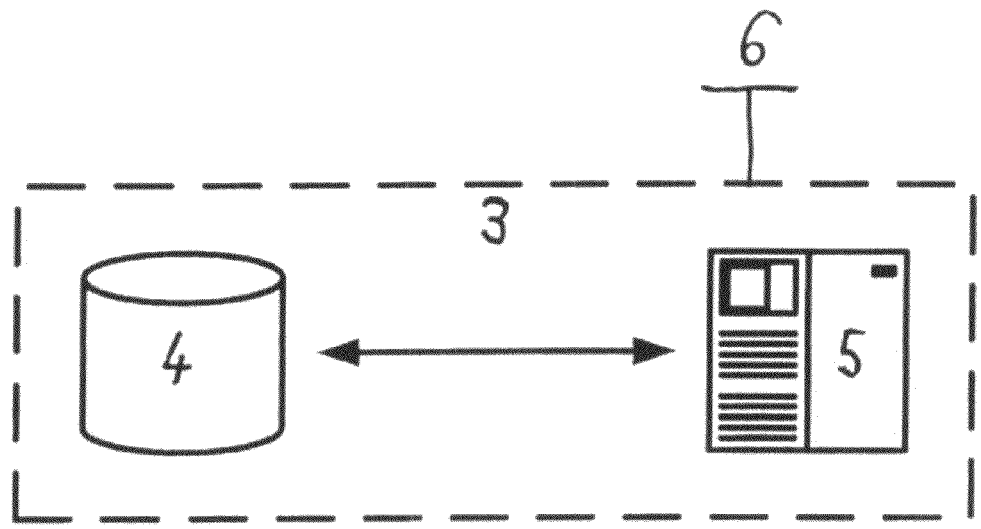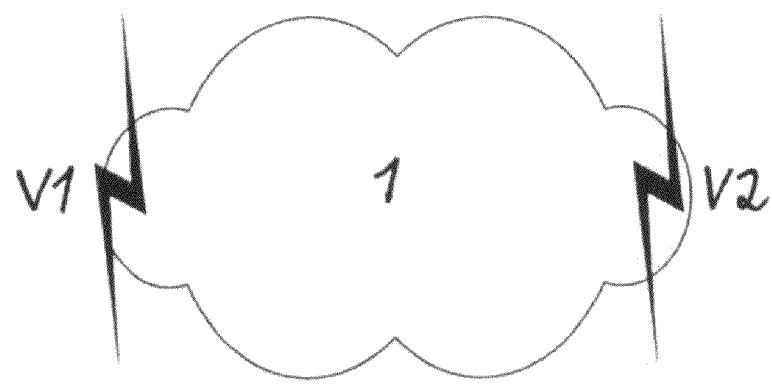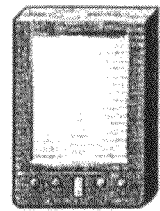

METHOD AND SYSTEM FOR INCORPORATING AUDIO CLIPS DURING A VOICE CALL

FIELD OF INVENTION

The present invention relates to a method and a system for incorporating audio clips during a voice call between a calling person and at least one called person. The present invention further relates to a method and system in which a person incorporates a desired audio clip into a voice call with another person by the press of a button on the person's telecommunications terminal.

BACKGROUND

Audio clips of this kind that can be incorporated into voice calls in progress are known from the general background art and are offered for mobile telecommunications terminals. This process requires equipping the mobile telecommunications terminal with a special software which provides the capability of incorporating audio clips as an auxiliary function for the telecommunications terminal. Different types of audio clips are able to be downloaded as data, preferably from the Internet, directly to the telecommunications terminal, and are stored there for use.

An inherent drawback of this related art is that the software and stored audio clips take up the memory capacity of the telecommunications terminal. In addition, a practical application is only possible in those telecommunications terminals which are able to be equipped or retrofitted with such an auxiliary function using software engineering procedures.

DETAILED DESCRIPTION

Embodiments of the present invention may be used in both fixed line and wireless or mobile communications sectors. Embodiments of the present invention may be used for a variety of purposes including, for example, entertainment. With the press of a button on his/her telecommunications terminal, a person has the option of playing one or more pre-selected audio clips during a voice call with another person. Such audio clips may include, for example, celebrity sayings, noises from nature, witty slogans, or the like.

In embodiments of the present invention, a method and a system for incorporating audio clips during a voice call that are independent of the type of telecommunications terminal used and/or that are distinguished by minimal memory space requirements is provided.

In terms of system design, an embodiment of the present invention incorporates the teaching that calling subscriber A 9 calls a VFS server (voice fun server) integrated in the telecommunications network, thus establishing a connection V1 7 between subscriber A 9 and the VFS server; and subscriber A 9 transmits the call number of subscriber B 10 to the VFS server, whereupon the VFS server establishes a connection V2 8 between the VFS server and subscriber B 10 to be called, and interconnects connections V1 7 and V2 8, thus allowing voice communication between subscriber A 9 and subscriber B 10; and the VFS server monitors at least connection V1 7 for the DTMF tones selected by assigned subscriber A 9 on the telecommunications terminal, so that, depending on the recognized DTMF tone, an assigned audio clip is able to be incorporated into the voice call between subscriber A 9 and subscriber B 10 in accordance with a link stored in the VFS server.

In embodiments of the present invention, in that, in order to use a function for incorporating audio clips, the telecommunications terminal of subscriber A 9 making use of the same merely needs to be capable of producing DTMF tones. Even if this is not the case, a simple auxiliary device, as is also used for remote querying of answering machines, may be used to produce DTMF tones in an available manner. The need for installing a special software to perform this auxiliary function is entirely eliminated. This constitutes a saving in corresponding memory space in the telecommunications terminal. The central VFS server assumes this functionality. The centralization feature allows a potential supplier of such audio clips to always offer audio clips for selection in accordance with the current trend. Third-party suppliers may also feed audio clips that are updated daily into the VFS server, for example, on the basis of user subscriptions. The service may be invoiced through the normal phone bill depending on the scope of service used. This eliminates the disadvantage associated with the principle of prepaying prior to using downloads. Embodiments of the present invention may make it feasible for audio clip incorporation functions to be implemented for the wireline network sector as well, thus overcoming the previous restriction to the mobile communications sector.

Embodiments of the present invention provides for the VFS server to include a database containing the subscriber-specific assignments of DTMF (dual tone multi-frequency) tones to audio clips, which are manageable by subscriber A 9, who makes use of the same, per Internet, SMS (short message service)/MMS (media message service) or by voice control using an operator/voice-recognition system based on chargeable phone numbers. Thus, the subscriber using the function has the option of conveniently selecting the desired audio clips and of assigning them to specific DTMF tones on his/her keypad. In embodiments of the present invention, a user may upload his/her own audio clips to the VFS server. Alternatively, a user may have the option of selecting auxiliary functions such as loudness level, foreign language and the like.

The call number of subscriber B 10 to be called is transmitted by calling subscriber A 9, for example, likewise via DTMF tones, to the VFS server in the course of establishing the connection. This requires that the VFS server be ready to receive input at the point in time when subscriber B 10 transmits the call number and that it signal this readiness to receive input to subscriber A 9 in advance. However, it is also possible for the VFS server to acquire the call number of subscriber B 10 to be called via a voice recognition. In embodiments of the present invention, a call number of subscriber B 10 to be called be appended directly to the call number of the VFS server. Of course, the call number of subscriber B 10 may be transmitted to the VFS server in other suitable ways as well.

An embodiment of the present invention provides that connection V2 8 also be monitored by the VFS server for DTMF tones for incorporating audio clips, as selected by assigned subscriber B 10 from the telecommunications terminal. Thus, as a passive user, subscriber B 10 also has the option of incorporating audio clips into the voice call in progress to subscriber A 9.

In an embodiment of the present invention, the DTMF tones selected by one of subscribers A 9 or B 10 are filtered out of the voice call by the VFS server, so that these tones are not able to be audibly perceived by the respective other subscriber A 9 or B 10. The advantage of this measure is that audio clips activated by one of subscribers A 9 or B 10 are not signaled in advance by a DTMF tone to the respective other subscriber B 10 or A 9.

In an embodiment of the present invention, it is provided that the call from calling subscriber A 9 be executed at the VFS server via a specially tariffed call number. This makes it possible to process the payment transactions for the special entertainment service according to an embodiment of the present invention. A tariffing may then be implemented as a function of the call duration or as a fixed rate per call. In an embodiment of the present invention, a tariffing may be implemented as a function of the number of retrieved audio clips. In this context, it is provided that the VFS server be an interface to third-party systems for billing purposes. An interface of this kind may also be used for statistical purposes in the context of a marketing research.

In embodiments of the present invention, to signal conversation readiness to subscriber A, once he/she has made contact with the VFS server, it may be provided that the VFS server direct a greeting message to subscriber A before interconnecting connections V1 and V2. This measure has the advantage of ensuring that the interconnection is not carried out suddenly and also that it does not come unexpectedly for subscriber A. In embodiments of the present invention, instead of a greeting message that may also include brief information on new system options for promotional purposes, it is conceivable, however, for simply one conventional waiting tone to be output to subscriber A until connections V1 and V2 are interconnected.

BRIEF DESCRIPTION OF THE DRAWING

The FIGURE shows a schematic representation of a system for incorporating audio clips during a voice call in accordance with an embodiment of the present invention.

DETAILED DESCRIPTION

In accordance with the figure, a calling subscriber A 9 makes telephone contact via a telecommunications network 1, constituted here as a mobile communications network, with a subscriber B 10 to be called, in that subscriber A 9 calls a VFS server 3, which is likewise integrated in telecommunications network 1, via his/her telecommunications terminal 2a constituted here as a type of PDA. Thus, a connection V1 7 is established between calling subscriber A 9 and VFS server 3. Using the keypad of his/her telecommunications terminal 2a, calling subscriber A 9 subsequently transmits the phone number of subscriber B 10 by DTMF tone to the VFS server. On the basis of this information, VFS server 3 establishes a connection V2 8 to telecommunications terminal 2b of subscriber B 10 to be called. Once calling subscriber A 9 is informed by the greeting message of VFS server 3, VFS server 3 interconnects connections V1 7 and V2 8, thus allowing voice communication between subscriber A 9 and subscriber B 10. During the voice communication between subscriber A 9 and subscriber B 10, VFS server 3 continually monitors connection V1 7 and V2 8 for DTMF tones selected by one of subscribers A 9 or B 10 that are acoustically filtered out for the other respective subscriber B 10 or A 9.

VFS server 3 includes a database 4 that a central processing unit 5 of VFS server 3 is in communication with. Database 4 contains subscriber-specific assignments of DTMF tones to audio clips for entertainment purposes. As a function of the DTMF tone recognized in accordance with the subscriber-specific assignment stored in database 4, VFS server 3 incorporates a desired audio clip into the voice call between subscriber A 9 and subscriber B 10. In this exemplary embodiment, this may be initiated both by subscriber A 9, as well as by subscriber B 10. VFS server 3 is also equipped with an interface 6 for a third-party system (not shown in detail) for statistical and billing purposes, thus enabling information technology procedures to be used to further process audio clips played on a subscriber-specific basis.

The present invention is not limited to the exemplary embodiments described above. Rather, modifications thereto, which fall under the scope of protection of the appended claims, are also conceivable. In another embodiment of the present invention, one may incorporate audio clips during a voice call to be carried out in a wireline network as well. In the case of a mobile communications network, instead of PDAs, conventional cellular phones may also be used; in a wireline network, conventional wireline telephones are suited, provided they have the capability of producing DTMF tones using the keypad. Even if this is not the case, in an embodiment, it is still possible to provide this functionality using a suitable auxiliary device.

What is claimed is:

1. A method for incorporating audio clips during a voice call between a calling a first subscriber and at least one called second subscriber, at least one of the first and at least one called second subscribers incorporates a desired audio clip into the voice call by the press of a button on a telecommunications terminal of the at least one of the first and at least one called second subscribers, comprising:

calling by the first subscriber a VFS server integrated in a telecommunications network, the calling establishing a first connection between the first subscriber and the VFS server;

transmitting by the first subscriber a call number of the at least one called second subscriber to the VFS server;

then establishing by the VFS server a second connection between the VFS server and the at least one called second subscriber;

interconnecting by the VFS server the first and second connections to allow voice communication between the first subscriber and the at least one called second subscriber;

monitoring by the VFS server at least the first connection for DTMF tones selected by the first subscriber on the telecommunications terminal;

then incorporating an assigned audio clip into the voice call between the first subscriber and the at least one second called subscriber in accordance with a link stored in the VFS server, the link being associated with a certain DTMF tone.

2. The method as recited in claim 1, further comprising: monitoring by the VFS server the second connection for the DTMF tones selected by the assigned second subscriber on the telecommunications terminal.

3. The method as recited in claim 1, further comprising: filtering the DTMF tones selected by one of the first and at least one called second subscriber out of the voice call by the VFS server, so that the DTMF tones are not able to be audibly perceived by the one of the first and at least one call second subscriber which did not select the DTMF tones.

4. The method as recited in claim 1, wherein the call from subscriber A is executed at the VFS server via a specially tariffed call number.

5. The method as recited in claim 1, wherein only specific call numbers are accepted by the VFS server for establishing a second connection.

6. The method as recited in claim 1, further comprising: before interconnecting by the VFS server the first and second connections, sending a greeting message signaling conversation readiness to the first subscriber.

7. The method as recited in claim 1, further comprising logging by the VFS server the audio clips played on a subscriber-specific basis for further processing using information technology procedures.

8. A system for incorporating audio clips during a voice call between a calling subscriber and at least one called subscriber, so that at least one of the calling and called subscribers incorporates a desired audio clip into the voice call by pressing a button on the respective subscriber's telecommunications terminal, comprising:

a telecommunications network;

a VFS server, the VFS server being integrated in the telecommunications network, wherein the calling subscriber calls the VFS server so that a connection is established between the calling subscriber and the VFS server, the calling subscriber transmits a call number of the at least one called subscriber to the VFS server, whereupon the VFS server establishes a connection between the VFS server and the at least one called subscriber and interconnects the connection between the calling subscriber and the VFS server and the connection between the VFS server and the at least one called subscriber, allowing the voice communication between the calling subscriber and the at least one called subscriber, the VFS server monitoring at least the connection between the calling subscriber and the VFS server for the DTMF tones selected by the calling subscriber on the telecommunications terminal, so that, depending on the recognized DTMF tone, an associated audio clip is incorporated into the voice call between the calling subscriber and the at least one called subscriber via a link stored in the VFS server.

9. The system as recited in claim 8, wherein the VFS server includes a database containing subscriber-specific assignments of DTMF tones to audio clips, which are manageable by the respective subscriber.

10. The system as recited in claim 8, wherein a call number of the at least one called subscriber transmittable from the calling subscriber to the VFS server via DTMF tones produced by the telecommunications terminal of the calling subscriber.

11. The system as recited in claim 8, wherein the VFS server has an interface to third-party systems for at least one of a statistical purpose and a billing purpose.

12. The system as recited in claim 9, wherein the respective subscriber manages the assignments of DTMF tones to audio clips, the audio clips, and the DTMF tones via at least one of Internet, SMS, MMS, and voice control using an operator/voice-recognition system based on chargeable phone numbers.

* * * * *